(12) United States Patent
Saitoh et al.

(10) Patent No.: US 8,406,102 B1
(45) Date of Patent: Mar. 26, 2013

(54) OPTICAL PICKUP AND OPTICAL READ/WRITE APPARATUS

(71) Applicant: Panasonic Corporation, Osaka (JP)

(72) Inventors: Yohichi Saitoh, Kyoto (JP); Jun-ichi Asada, Hyogo (JP); Kazuo Momoo, Osaka (JP); Hideki Hayashi, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/645,758

(22) Filed: Oct. 5, 2012

(30) Foreign Application Priority Data

Oct. 17, 2011 (JP) ................................. 2011-227530

(51) Int. Cl.
  *G11B 7/00* (2006.01)
(52) U.S. Cl. ........... 369/47.15; 369/112.03; 369/110.01; 369/112.16; 369/97
(58) Field of Classification Search .................. None
  See application file for complete search history.

(56) References Cited

U.S. PATENT DOCUMENTS

| 5,835,471 | A | 11/1998 | Miyamoto et al. |
| 5,956,302 | A * | 9/1999 | Maeda et al. ............... 369/44.23 |
| 6,584,059 | B1 | 6/2003 | Saimi et al. |
| 7,742,384 | B2 * | 6/2010 | Yamasaki et al. ........ 369/112.28 |
| 2008/0031106 | A1 | 2/2008 | Terashima et al. |

FOREIGN PATENT DOCUMENTS

| JP | 06-162532 | | 6/1994 |
| JP | 06-325400 | A | 11/1994 |
| JP | 08-306057 | A | 11/1996 |
| JP | 10-214435 | A | 8/1998 |
| JP | 2000-306262 | A | 11/2000 |
| JP | 2006-040492 | A | 2/2006 |
| JP | 2006-286070 | A | 10/2006 |
| WO | 01/11616 | A1 | 2/2001 |

* cited by examiner

*Primary Examiner* — Muhammad N Edun
(74) *Attorney, Agent, or Firm* — Renner, Otto, Boisselle & Sklar, LLP

(57) ABSTRACT

An optical pickup includes: a light source; a first diffractive element which diffracts light polarized in a particular direction; an objective lens; a lens actuator which shifts the objective lens so that the magnitude of shift from its initial position in a tracking direction has an upper limit of 0.3 mm to 0.6 mm; a wave plate; a second diffractive element which has two diffraction regions configured to diffract light polarized in a direction that intersects with the particular direction at right angles and which splits the write beam reflected from the optical storage medium through each diffraction region into a transmitted light beam and at least one diffracted light beam; and a photodetector which detects the transmitted light beam, the diffracted light beams that have left the two diffraction regions, and the read beam reflected from the optical storage medium.

7 Claims, 13 Drawing Sheets

(a)

(b)

VIEWED IN THE DIRECTION INDICATED BY THE ARROW $$\text{TE BALANCE (\%)} = \frac{A-B}{2(A+B)} \times 100$$

VIEWED IN THE DIRECTION INDICATED BY ARROW A

TRACKING SIGNAL: $(c2-c5)+k(c4+c6)-k(c1+c3)$

VIEWED IN THE DIRECTION INDICATED BY ARROW A

OPTICAL PICKUP AND OPTICAL READ/WRITE APPARATUS

BACKGROUND OF THE INVENTION

1. Field of the Invention

The present disclosure relates to an optical pickup and optical read/write apparatus which writes information on an optical storage medium such as an optical tape and read the information being written in parallel.

2. Description of the Related Art

An optical tape drive system which performs read and write operations on an optical tape medium using a plurality of optical pickups at the same time by utilizing a high density optical recording technique has been proposed as an optical read/write apparatus that can be used effectively for the purpose of bulk data archival and storage. Japanese Laid-Open Patent Publication No. 2006-286070 (which will be referred to herein as "Patent Document No. 1" for convenience sake) discloses an example of such an optical tape drive system.

Meanwhile, in a conventional magnetic tape drive system, a write head and a read head are arranged separately with respect to a track on which data is going to be written. And by writing data and reading the data being written simultaneously, verification can be made to see if the data has been written just as intended. In this manner, high speed processing can get done with a sufficiently high degree of reliability ensured.

It is known that such a verify technology is also applicable to an optical read/write apparatus that is designed to read and write data from/on a disc medium such as a magneto-optical (MO) disc, a Blu-ray Disc (BD), a DVD or a CD using an optical pickup. According to such a technology, a light beam that has been emitted from a laser light source is split through a diffraction grating into a zero-order light beam and ±first-order light beams, with which a storage layer is irradiated. In this case, a write operation can be performed by irradiating the storage layer with the zero-order light beam and a verify operation can be performed by detecting the ±first-order light beams. Such a technology is called a DRAW (direct read after write) technology. According to such a technology, an error check can be made right after data has been written, and therefore, the processing can get done quickly and the transfer rate can be increased. A read/write apparatus that adopts the DRAW technology is disclosed in Japanese Laid-Open Patent Publication No. 6-162532 (which will be referred to herein as "Patent Document No. 2" for convenience sake), for example.

An optical read/write apparatus needs to perform a focus control and a tracking control appropriately during read and write operations. Particularly when an optical tape is used as an optical storage medium, the tracking control needs to be performed in accordance with the properties of the tracks of the optical tape, which are different from those of a normal optical disc.

Examples of known tracking control methods for optical disc drives include the push-pull (PP) method, the advanced push-pull (APP) method, and the correct far field (CFF) method, which are disclosed in Patent Document No. 2 and Japanese Laid-Open Patent Publications No. 8-306057 and No. 2000-306262 (which will be referred to herein as "Patent Documents Nos. 3 and 4", respectively, for convenience sake), respectively.

However, none of these known optical read/write apparatuses can obtain a tracking signal that is suitably used in an optical storage medium such as an optical tape where the tracking position may change significantly during reading or writing.

Thus, the present disclosure provides an optical read/write apparatus that can stabilize the tracking performance even when dealing with an optical storage medium such as an optical tape where the track position may change significantly during the operation.

SUMMARY OF THE INVENTION

The present disclosure provides an optical pickup which writes data on a track on an optical storage medium and reads the data being written on the track in parallel. The optical pickup includes: a light source configured to emit a light beam; a first diffractive element configured to diffract light that is polarized in a particular direction and split the light beam that has been emitted from the light source into a plurality of light beams including a write beam and a read beam; an objective lens configured to converge the write beam and the read beam onto the same track on the optical storage medium; a lens actuator configured to shift the objective lens to perform a focus control and a tracking control so that the magnitude of shift of the objective lens from its initial position as measured in a tracking direction has an upper limit of 0.3 mm to 0.6 mm; a wave plate that is arranged between the first diffractive element and the optical storage medium and that is designed so that the polarization direction of light going from the first diffractive element toward the wave plate is perpendicular to the polarization direction of light going from the wave plate toward the first diffractive element; a second diffractive element including two diffraction regions with different diffraction properties that are arranged in a direction corresponding to the tracking direction, each said diffraction region being configured to diffract light that is polarized in a direction that intersects with the particular direction at right angles, the second diffractive element configured to split the write beam that has been reflected from the optical storage medium through each said diffraction region into a transmitted light beam and at least one diffracted light beam; and a photodetector including a plurality of photosensitive elements that are configured to detect the transmitted light beam, the diffracted light beams that have left the two diffraction regions, and the read beam that has been reflected from the optical storage medium.

According to the present disclosure, a tracking control can be performed with good stability even on an optical storage medium such as an optical tape where the track position changes significantly during the operation. It should be noted that the idea of the present disclosure is applicable to not only an optical tape but also an optical disc or any other optical storage medium as well.

Other features, elements, processes, steps, characteristics and advantages of the present invention will become more apparent from the following detailed description of preferred embodiments of the present invention with reference to the attached drawings.

Figure 10:
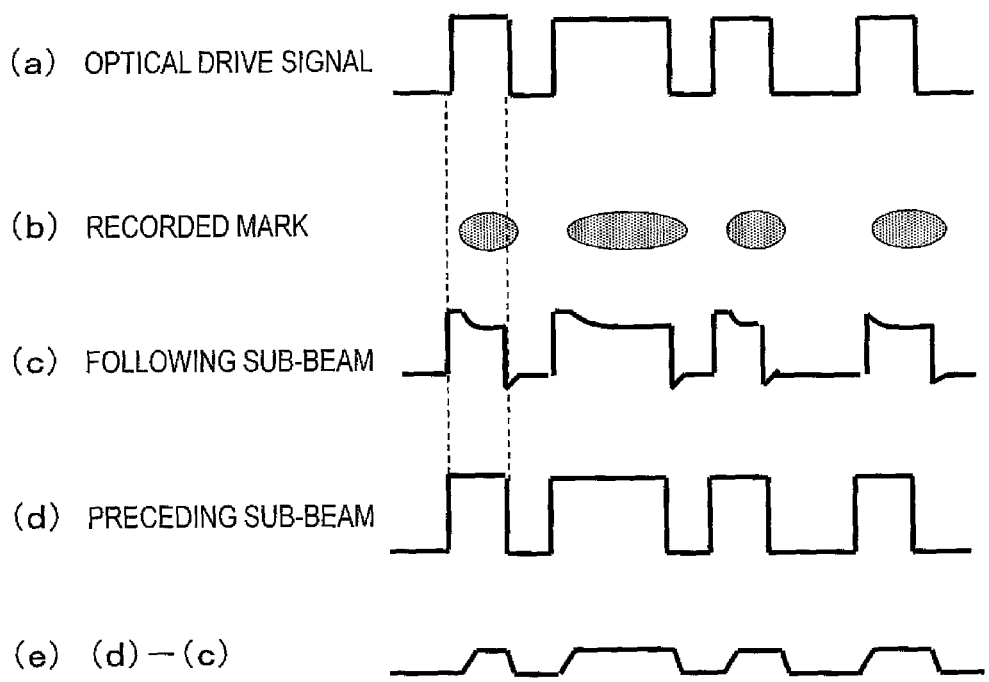

Portion (a) of FIG. 10 shows an exemplary waveform of an optical drive signal. Portion (b) of FIG. 10 illustrates the shapes of marks to be recorded. Portions (c) and (d) of FIG. 10 show the waveforms of signals representing the reflected light of sub-beams that irradiate the optical tape 2 after and before the main beam irradiates it, respectively. Portion (e) of FIG. 10 shows the waveform of a signal obtained by calculating the difference between those two read signals.

Figure 11A:
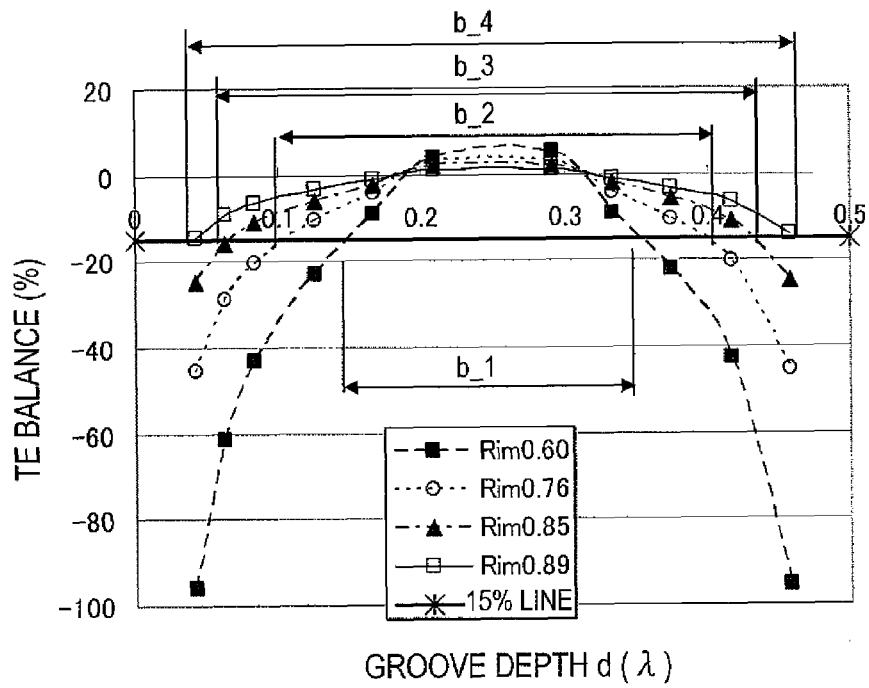

FIG. 11A shows a result of a simulation that was carried out to see how the TE balance would change with the groove depth d and the radial Rim intensity.

Figure 11B:
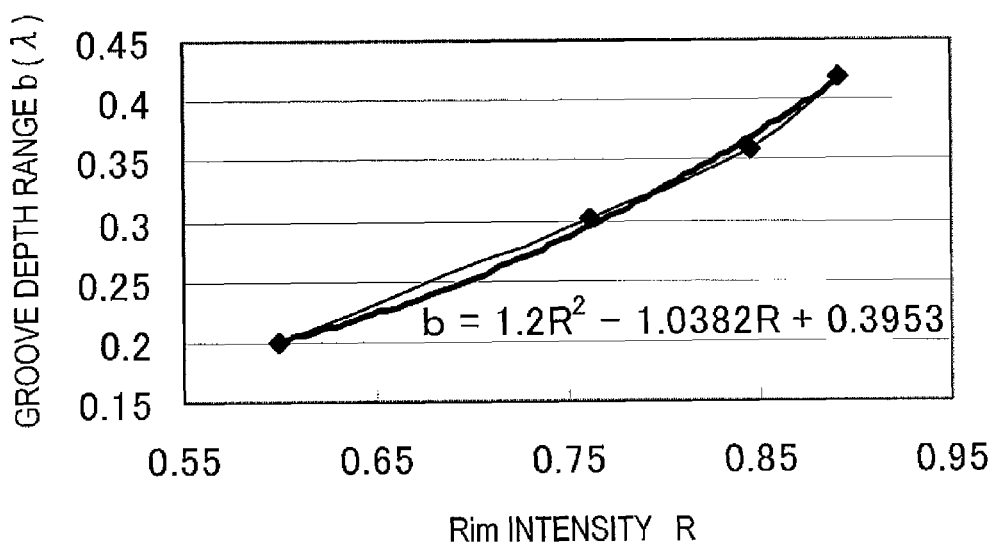

FIG. 11B is a graph showing how the radial Rim intensity R changes with the groove depth range b in which the absolute value of the TE balance can be reduced to 15% or less.

Figure 12A:
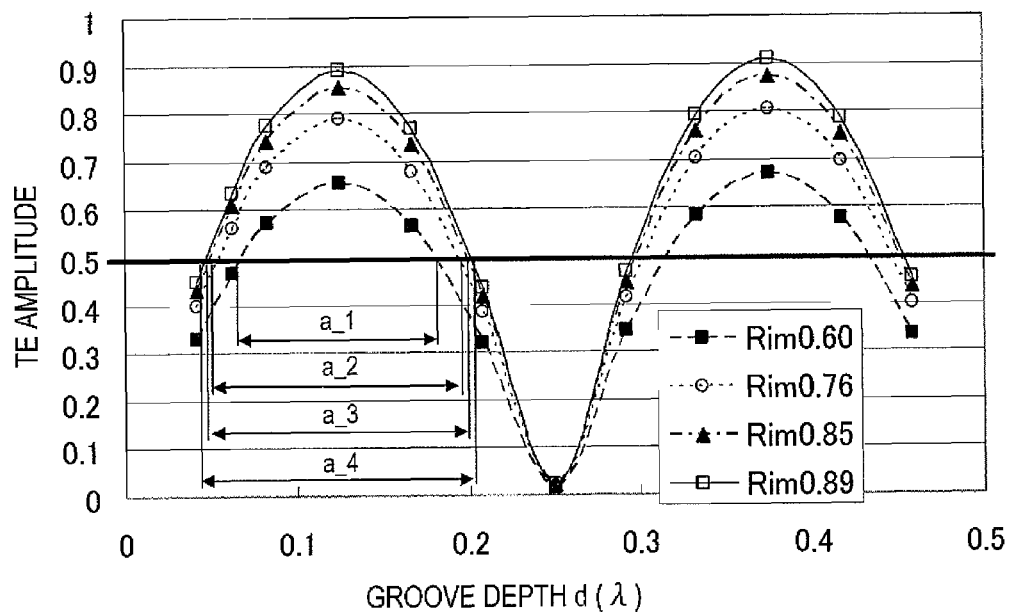

FIG. 12A shows a result of a simulation that was carried out to see how the TE amplitude would change with the groove depth d and the radial Rim intensity.

Figure 12B:
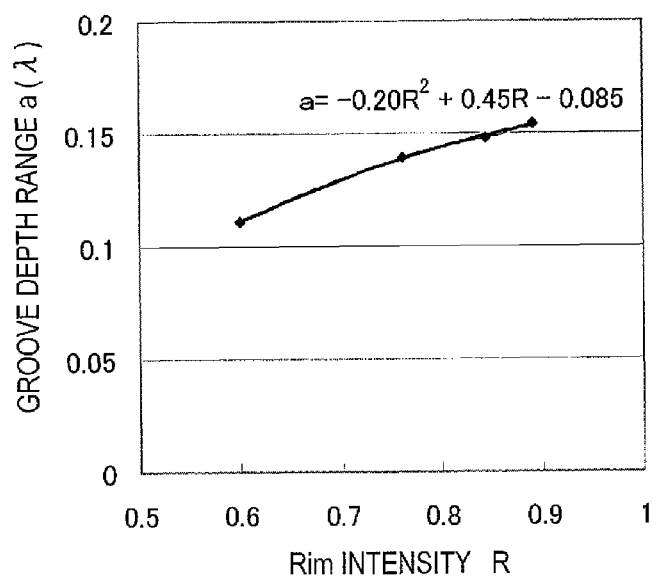

FIG. 12B is a graph showing how the radial Rim intensity R changes with the groove depth range a in which the TE amplitude can be reduced to 0.5 or less.

Figure 13:
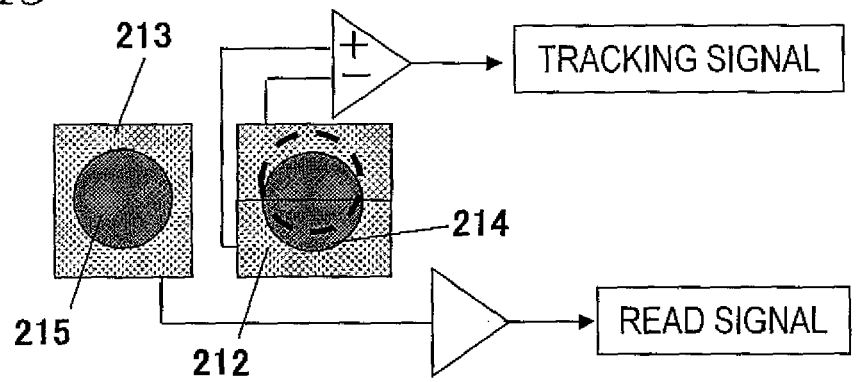

FIG. 13 illustrates a photodetector and its photosensitive elements for use to obtain a tracking signal by the spot sized detection method.

Figure 14:
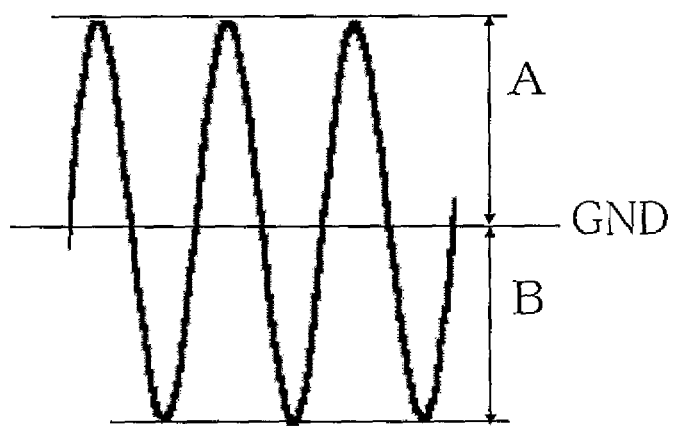

FIG. 14 shows a definition of a TE balance.

Figure 15:
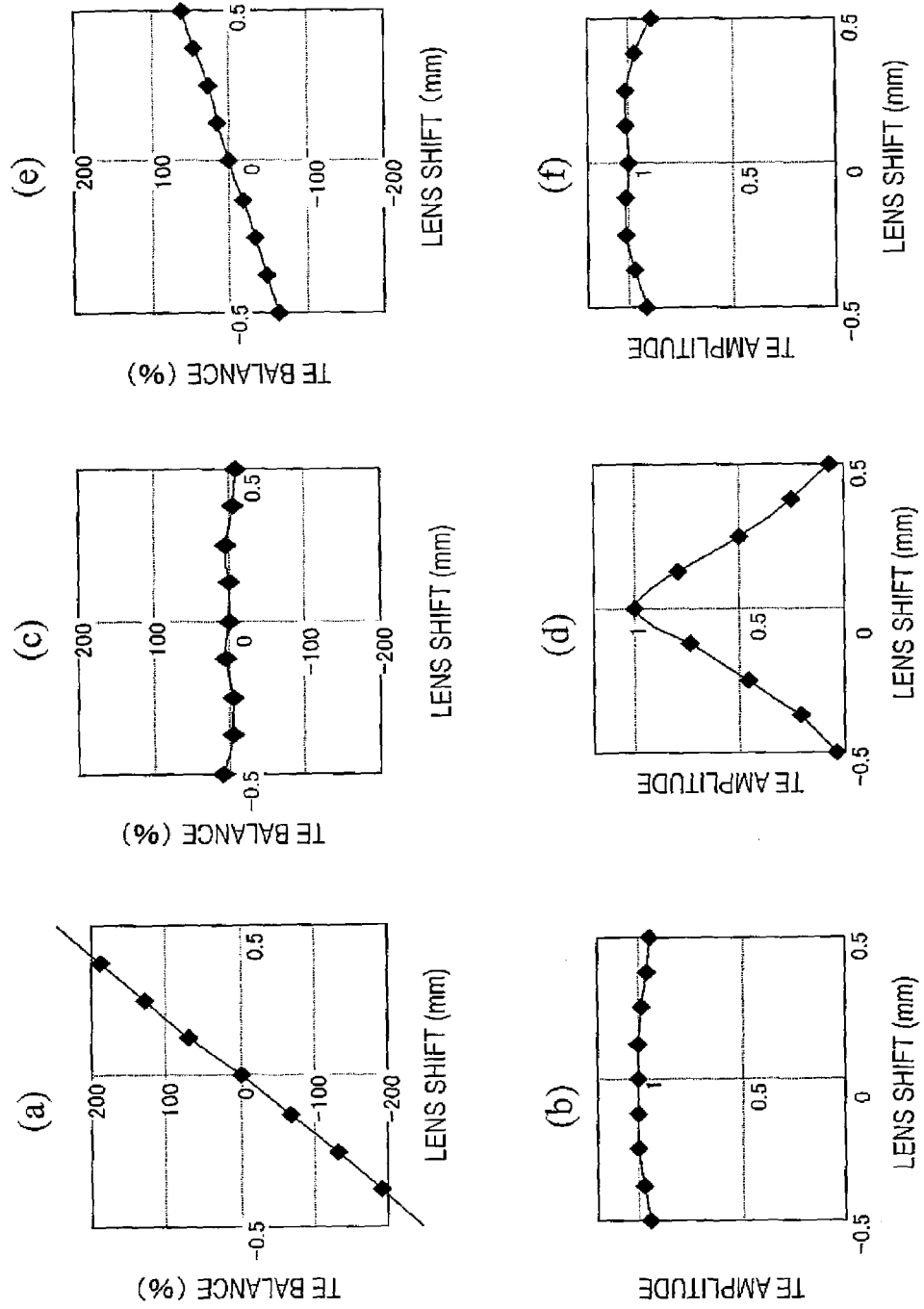

FIGS. 15(*a*) and 15(*b*) show how the TE balance and the TE amplitude calculated change with the magnitude of lens shift according to the PP method. FIGS. 15(*c*) and 15(*d*) show how the TE balance and the TE amplitude calculated change with the magnitude of lens shift according to the APP method. And FIGS. 15(*e*) and 15(*f*) show how the TE balance and the TE amplitude calculated change with the magnitude of lens shift according to the CFF method.

Figure 16:
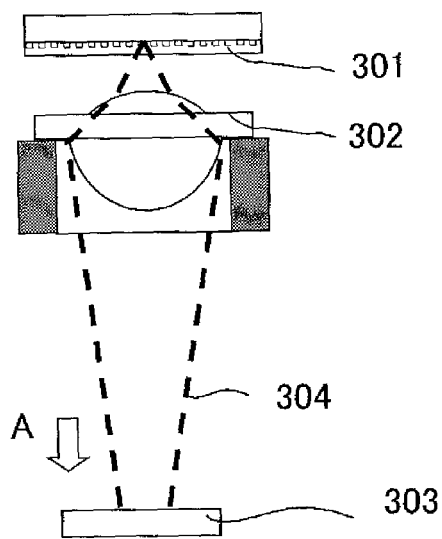

FIG. 16 illustrates an exemplary optical arrangement for an optical pickup that performs a tracking control by the APP method.

Figure 17:
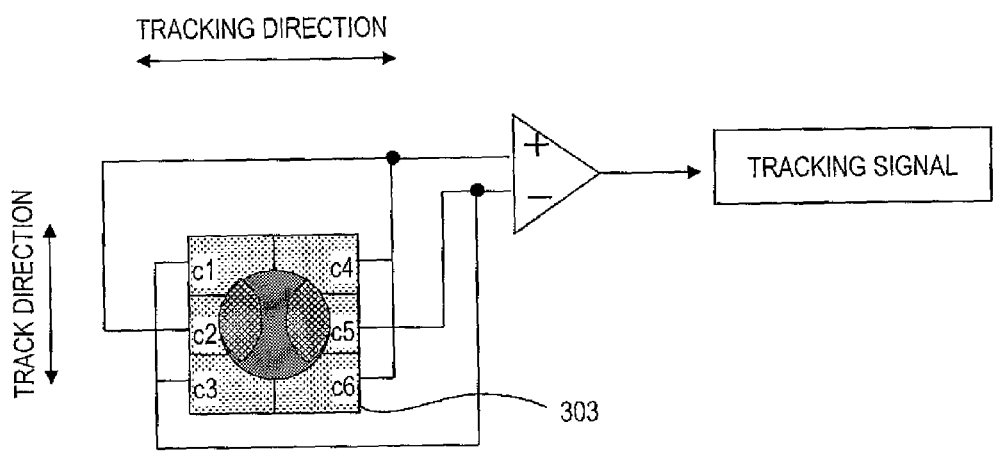

FIG. 17 illustrates an exemplary arrangement for a photodetector that obtains a tracking signal by the APP method.

Figure 18:
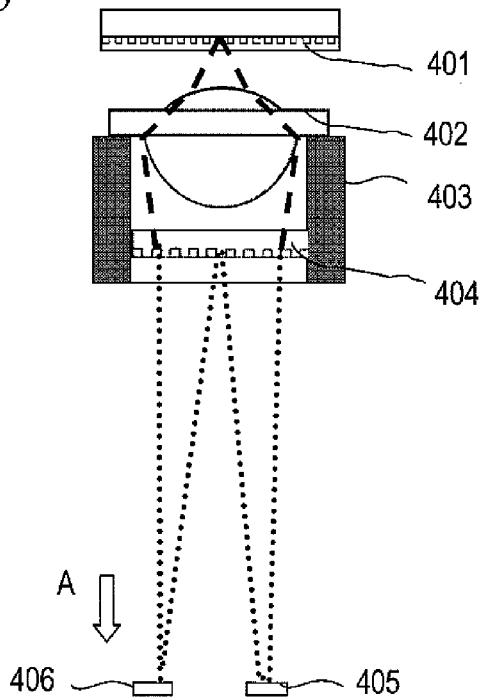

FIG. 18 illustrates an exemplary optical arrangement for an optical pickup that performs a tracking control by the CFF method.

Figure 19:
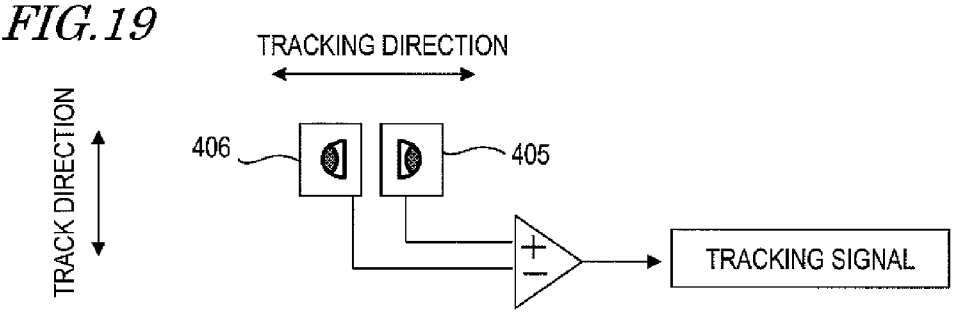

FIG. 19 illustrates an exemplary arrangement for a photodetector that obtains a tracking signal by the CFF method.

Figure 20:
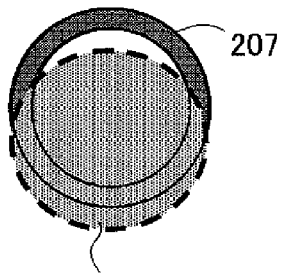

FIG. 20 shows how the read beam deviates with respect to the center of the aperture of an objective lens.

DETAILED DESCRIPTION OF PREFERRED EMBODIMENTS

Hereinafter, embodiments of the present disclosure will be described with reference to the accompanying drawings as needed. It should be noted that the description thereof will be sometimes omitted unless it is absolutely necessary to go into details. For example, description of a matter that is already well known in the related art will be sometimes omitted, so will be a redundant description of substantially the same configuration. This is done solely for the purpose of avoiding redundancies and making the following description of embodiments as easily understandable for those skilled in the art as possible.

It should be noted that the present inventors provide the accompanying drawings and the following description to help those skilled in the art understand the present disclosure fully. And it is not intended that the subject matter defined by the appended claims is limited by those drawings or the description.

1-1. Overall Configuration

Figure 1:
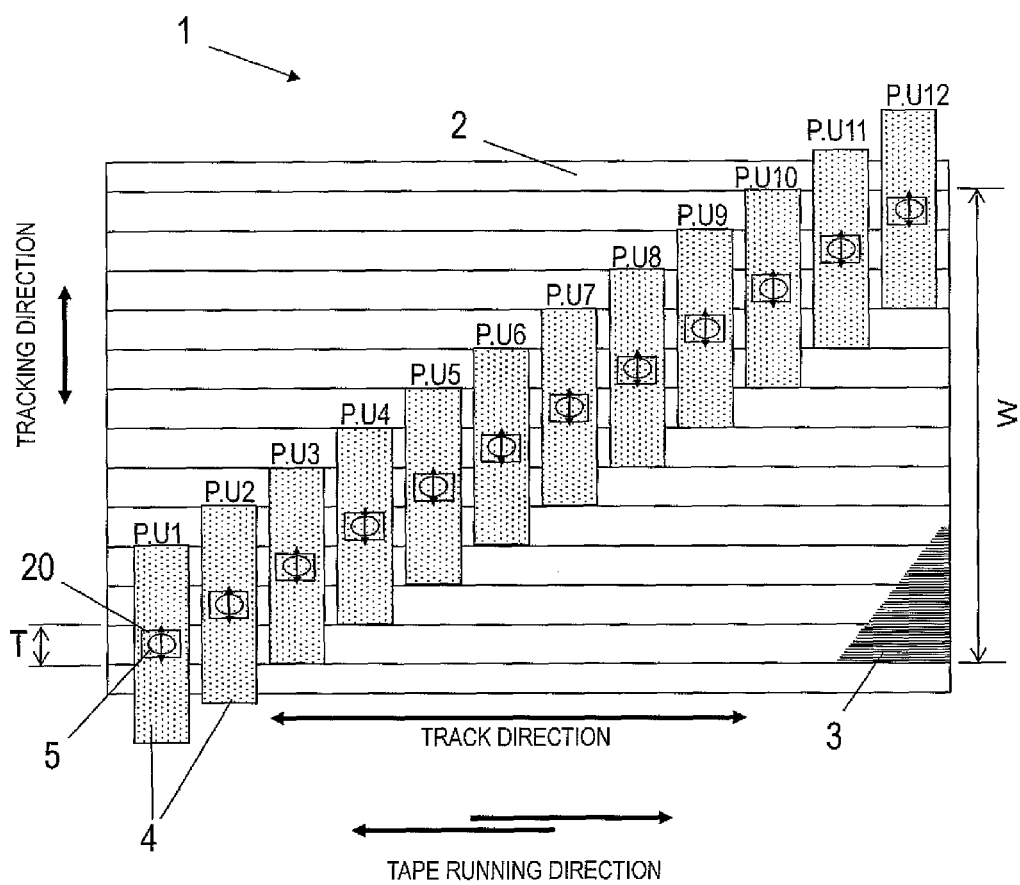
FIG. 1 illustrates a configuration for an optical tape machine as an embodiment of the present disclosure.

FIG. 1 illustrates a configuration for an optical read/write apparatus as an embodiment of the present disclosure. The optical read/write apparatus of this embodiment is an optical tape machine 1 that can write data on an optical tape 2 and can read the data from the optical tape 2. The optical tape machine 1 may be used to back up a huge quantity of data, for example. In order to back up such an enormous quantity of data in a short time with the transfer rate increased, the optical tape machine 1 includes a lot of optical pickups 4. By using those optical pickups 4 at the same time, the DRAW operation of writing data on the optical tape 2 and reading the data being written in parallel can be carried out. Any number of optical pickups 4 may be arranged in any pattern. In this embodiment, twelve optical pickups 4 (which are also identified by "P. U. 1" through "P. U. 12") are arranged so as to cross the track direction of the optical tape 2. As a result, such an enormous quantity of data can be read and written from/on multiple tracks in parallel. Also, this optical tape machine 1 is configured so that the optical tape 2 can run both in the forward direction and in the reverse direction. That is why when a read or write operation gets done through the end of the optical tape 2, the read/write operation can be continued just by reversing the tape running direction without rewinding the optical tape 2.

On the optical tape 2, tracks 3 were transferred in advance at a pitch of sub-microns (i.e., less than 1 μm) onto a tape-shaped film by nano-printing technology and a storage layer and a protective layer are stacked thereon. The tracks 3 can be formed substantially parallel to the running direction of the tape. Although only some of those tracks 3 are illustrated in FIG. 1 to make this drawing easily understandable, actually a huge number of tracks 3 cover the entire recordable area of the optical tape 2. The width W of the recordable area of the optical tape 2 may fall within the range of a few millimeters through several centimeters. Also, the optical tape 2 may have a thickness of a few μm through several ten μm and its groove depth may be set to be 1 μm or less, for example.

Those twelve optical pickups 4 are fixed and arranged so that each of those optical pickups 4 is located in an associated one of twelve recording zones, which are defined by evenly dividing the recordable area of the optical tape 2 into twelve in the width direction. That is why the tracks in each recording zone can be accessed just by moving the objective lens 5. The objective lens 5 is driven by the lens actuator 20 so as to be able to shift perpendicularly to the tracks (i.e., in the tracking direction). Supposing the recordable area has a width W of 4.8 mm, for example, each recording zone has a width T of 0.4 mm (=4.8 mm/12). In that case, the optical tape machine 1 could be configured so that the objective lens 5 can be shifted within the range of ±0.2 mm with respect to the center of its associated recording zone as its initial position. In this embodiment, however, with the error involved with the manufacturing process of the optical tape 2 and the influence of wobbling of the tape running taken into consideration, the objective lens 5 is configured to be able to shift as long a distance as ±0.3 to 0.6 mm at maximum. In the following description, to make the objective lens 5 shift in the tracking direction will be sometimes referred to herein as a "lens shift".

Figure 2:
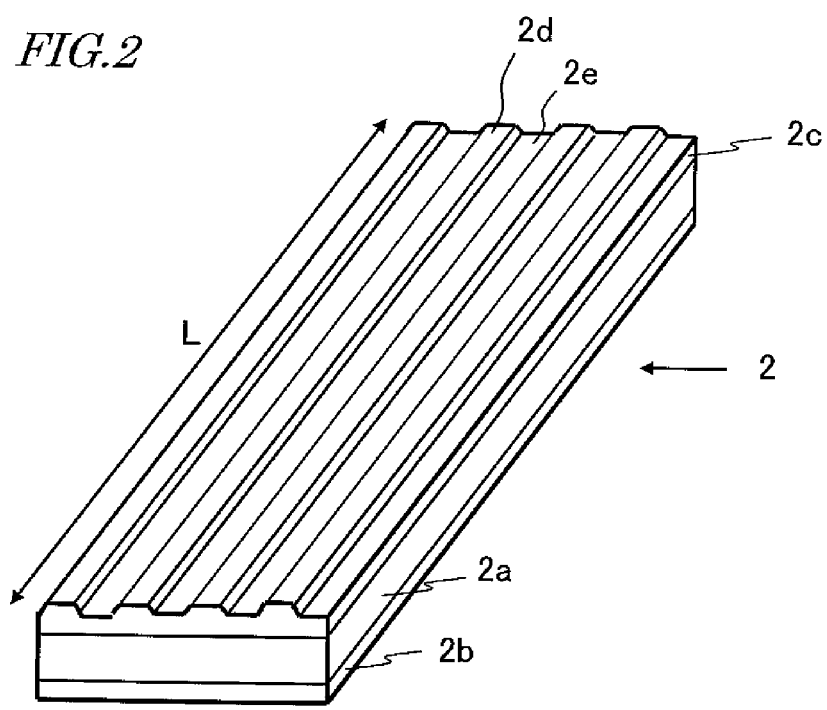
FIG. 2 is a perspective view schematically illustrating a portion of an optical tape according to an embodiment on a larger scale.

FIG. 2 is a perspective view schematically illustrating a portion of an optical tape 2 on a larger scale. The optical tape 2 may include a base film 2a, a back coating layer 2b that is adhered to the back surface of the base film 2a, and an imprint layer 2c that is supported by the base film 2a. On the upper surface of the imprint layer 2c, lands 2d and grooves 2e have been formed. Although not shown in FIG. 2, a reflective film and a recording material film are deposited over the entire upper surface of the imprint layer 2c. The optical tape 2 is extended in the longitudinal direction L and may have a length of several hundred meters, for example.

It should be noted that FIG. 2 illustrating the optical tape 2 is not to scale. Actually, the optical tape 2 may have several hundreds, or an even greater number, of lands 2d and grooves 2e. In one embodiment, data is written on either the lands 2d or the grooves 2e. The lands 2d or the grooves 2e on which data is written will be referred to herein as "tracks", which may have a pitch of 0.2 μm to 0.4 μm, for example. In the following description, data is supposed to be written on the grooves 2e. That is why the tracks will be sometimes referred to herein as "track grooves".

On the optical tape 2, a mark can be recorded optically by irradiating the tape 2 with a light beam. More specifically, such a mark is recorded on its recording material film. The light beam is radiated by an optical pickup 4 that includes a light source and an objective lens 5 that focuses the light beam emitted from the light source on the optical tape 2. When the optical pickup 4 irradiates the optical tape 2 with a light beam, the irradiated portion of the optical tape 2 comes to have a different optical property such as a reflectance or a refractive index from the rest (i.e., the non-irradiated portion) of the optical tape Such a portion, of which the optical property has changed in this manner, is called a "recorded mark".

In optical tape technologies, data can be read out from the optical tape 2 by irradiating the tape 2 with a relatively weak light beam with a constant intensity and detecting the light that has been modulated by, and reflected from, the optical tape 2. In writing data on the optical tape 2, data is written there by irradiating the optical tape 2 with a pulsed light beam, of which the optical power has been modulated according to the data to be written, and locally changing the property of the recording material film.

When data is going to be written on the recording material film, the recording material film is irradiated with such a light beam, of which the optical power has been modulated as described above, thereby recording an amorphous mark on a crystalline recording material film. Such an amorphous recorded mark is left there by heating a portion of the recording material film that has been irradiated with a write light beam to a temperature that is equal to or higher than its melting point and then rapidly cooling that portion. If the optical power of a light beam that irradiates the recorded mark is set to be relatively low, the temperature of the recorded mark being irradiated with the light beam does not exceed its melting point and the recorded mark will turn crystalline again after having been cooled rapidly (i.e., the recorded mark will be erased). In this manner, the recorded mark can be rewritten over and over again. However, if the power of the light beam for writing data had an inappropriate level, then the recorded mark would have a deformed shape and sometimes it could be difficult to read the data as intended.

To read or write data from/on the optical tape 2, the light beam always needs to maintain a predetermined converging state on a target track. For that purpose, a "focus control" and a "tracking control" are performed. In order to perform a focus control and a tracking control, the focus error or the tracking error is detected based on the light that has been reflected from the optical tape 2 and the position of the light beam spot is adjusted so as to reduce the error as much as possible. The magnitudes of the focus error and the tracking error are respectively represented by a "focus error signal" and a "tracking error signal", both of which are generated based on the light that has been reflected from the optical tape 2. The focus error signal and the tracking error signal are output from a photodetector that each optical pickup 4 has. The controller of the optical tape machine 1 performs a focus control and a tracking control on each optical pickup 4 in response to the focus error signal and tracking error signal supplied from the photodetector of the optical pickup 4. In the following description, the focus error signal and the tracking error signal will be sometimes referred to herein as a "focus signal" and a "tracking signal", respectively.

Hereinafter, an exemplary circuit configuration for the optical tape machine 1 will be described with reference to FIG. 3, which is a block diagram illustrating a circuit configuration for the optical tape machine 1 of this embodiment. The optical tape machine 1 illustrated in FIG. 3 includes an optical pickup assembly 40 which is a set of optical pickups 4, motors 506 and 507 which make the optical tape 2 run, and circuit blocks that are electrically connected to the optical pickup assembly 40 and the motors 506 and 507 and that include a frontend signal processing section 520, an encoder/decoder 530, a servo control section 550, a driver amplifier 560, and a CPU (system controller) 540 to be described below.

The output of each optical pickup 4 is supplied to the encoder/decoder 530 by way of the frontend signal processing section 520. In reading data, the encoder/decoder 530 decodes the data that is stored on the optical tape 2 based on the signal that has been generated by each optical pickup 4. The encoder/decoder 530 includes an optical power modulator 531. In writing data, the encoder/decoder 530 encodes the data to generate a signal to be written on the optical tape 2. In this description, this signal will be referred to herein as an "optical drive signal". The optical drive signal is supplied to each optical pickup 4 by way of the optical power modulator 531. Using this signal, the intensity of the light beam emitted from the light source of each optical pickup 4 is modulated so as to record a mark as intended on a target track on the optical tape 2.

The frontend signal processing section 520 generates a read signal based on the output of each optical pickup and also generates a focus error signal FE and a tracking error signal TE. The read signal thus generated is then supplied to the encoder/decoder 530. The focus error signal FE and the tracking error signal TE are then supplied to the servo control section 550. In response, the servo control section 550 gets the motors 506 and 507 controlled by a driver amplifier 560. The servo control section 550 also gets the position of an objective lens 5 controlled by a lens actuator 20 in each optical pickup 4. The encoder/decoder 530, the servo control section 550 and all the other components are controlled by the CPU 540. The respective circuit blocks illustrated in FIG. 3 can be implemented by assembling together integrated circuit elements, memories and other electronic parts, which form the respective sections, on a circuit board.

1-2. Problem

Next, it will be described what problem will arise when the optical tape 2 is used as an optical storage medium and will also be described what configuration the optical pickup 4 may use to overcome that problem.

In the optical tape machine 1, each optical pickup 4 is arranged at a fixed position in its associated recording zone unlike a normal optical disc apparatus. That is why to have access to a target track 3, the objective lens 5 needs to be moved, which is not easy, however, due to an optical tape machine's own problem to be described below.

To make the optical tape 2, it is necessary to perform the processing step of forming track grooves continuously on a long strip of a sheet. Specifically, the optical tape 2 may be formed by performing the following manufacturing processing steps. First of all, a sheet on which a pattern of track grooves has been formed by an electron beam process is attached to a metallic roller and provided as a master. Next, a UV curable resin is applied onto a base material, which is a roll of a film that is the material of the tape, and the groove transferring metallic roller that has been provided as the master is pressed against the resin, thereby transferring the track groove pattern continuously. Thereafter, the UV curable resin gets cured, thereby forming track grooves on the tape. Subsequently, a recording material film is deposited by sputtering or any other process on the tape on which the track grooves have been formed and then a protective film is stacked thereon, thereby completing an original sheet of an optical tape. Next, the roll of original optical tape sheet is continuously cut to a width of ½ inches by splitter process, thereby making a lot of optical tapes at the same time.

In such an optical tape manufacturing process, some positioning error could be caused while the track groove pattern is transferred from the master onto the original tape material and the original tape material being turned could swing in the axial direction. As a result, misalignment could occur between the tape material and the positions on which the track groove pattern has been transferred. Likewise, the original tape material could also swing along the axis of rotation during the slitter process. Consequently, in the optical tape completed, sometimes the track grooves are not parallel to the edges of the tape that has been cut and their positions may have an error in some cases. Those errors are not a problem in the case of a magnetic tape that needs no grooves. And those errors will never be caused in an optical disc, which is manufactured integrally with a disklike stamper. That is to say, these are problems unique to an optical tape.

In addition, while the tape is running, the positions of the respective tracks are determined by a tape guide with respect to the edges of the tape. As a result, the positions of the track grooves will vary with respect to the position of the optical pickups. Such a phenomenon will be referred to herein as a "run out" of an optical tape. Although it depends on the environment, this variation in position is approximately ±0.1 to 0.3 mm. On top of that, since the respective optical pickups 4 are fixed in the machine, a lens shift of ±0.2 mm is needed to have access to a particular track in a recording zone. Therefore, even if the error involved with the optical tape manufacturing process is neglected, an objective lens shift of ±0.3 to 0.5 mm is needed in order to follow the tracks.

In a known optical disc apparatus, the objective lens has been allowed to shift approximately ±0.5 mm for a recordable disc, and approximately ±0.1 mm for a read-only disc, in order to follow the tracks, and it has been believed sufficient to allow a shift range of approximately ±0.2 mm during the design process. In an optical tape machine such as the one of this embodiment, however, the objective lens needs to be shifted within a very broad range that is 1.5 to twice as large as the movable range of an optical disc apparatus. Thus, according to this embodiment, the objective lens 5 is shifted by the actuator 20 so that the upper limit of the magnitude of shift with respect to the initial position of the objective lens 5 in the tracking direction becomes 0.3 mm to 0.6 mm. It would be more beneficial to set the upper limit of the magnitude of shift the range of 0.35 mm to 0.55 mm and even more beneficial to set the upper limit within the range of 0.4 mm 0.5 mm.

On the other hand, the optical pickup 4 with the DRAW function splits a light beam that has been emitted from a light source into a plurality of light beams including a main beam (i.e., a write beam) and a sub-beam (i.e., a read beam) and forms two or more light beam spots on the same track on the optical tape 2. For that reason, in order to use the given light as effectively as possible and to ensure mass-productivity by minimizing the spot position adjustment problem, a one-beam method is adopted as the tracking detecting method. In this description, the "one-beam method" is a method for obtaining a tracking error signal using only the main beam. Examples of known one-beam tracking detecting methods include the push-pull (PP) method, the advanced push-pull (APP) method, and the correct far field (CFF) method. If any of these known tracking detecting methods were used as it is, however, the following problem would arise.

FIG. 13 illustrates an exemplary configuration for a photodetector for use when the PP method is adopted. The main beam and the sub-beam reflected from an optical storage medium form light beam spots 214 and 215 on photosensitive elements 212 and 213, respectively, on the photodetector. In this case, as the objective lens shifts, the light beam spot 214 on the photodetector shifts to the position indicated by the dashed circle in FIG. 13, for example. The magnitude of such a shift of the light beam spot on the photodetector is proportional to the magnitude of lens shift. If the light beam spot shifts, the tracking error signal loses its symmetry. And according to the degree of that asymmetry (which will be referred to herein as a "TE balance"), the tracking error signal comes to have a different value from original one. As shown in FIG. 14, the TE balance (%) is defined to be a quantity represented by $(A-B)/2(A+B)\times 100$, where A is the positive amplitude of the tracking error signal and B is the negative amplitude thereof.

FIGS. 15(a) and 15(b) show how the TE balance and the tracking signal's amplitude (which will be referred to herein as "TE amplitude") calculated change with the magnitude of lens shift according to the PP method. In FIG. 15, the TE amplitude is the amplitude of the TE signal that is normalized by regarding its value when the magnitude of lens shift is 0 mm to be one. In this case, the TE balance and TE amplitude were calculated under the condition including a wavelength of 0.405 m, an objective lens' numerical aperture (NA) of 0.85, a track groove pitch of 0.32 μm, a track groove depth of 0.04 μm, and a radial Rim intensity of 0.6. In this case, the radial Rim intensity means the ratio of the intensity of the incoming light at the end of the aperture of the objective lens to that of the incoming light at the center of the aperture of the objective lens. That is to say, if the respective intensities at the center and end of the aperture are the same, then the radial Rim intensity becomes one. The radial Rim intensity indicates the degree of the diaphragm and varies according to the size of the aperture and the distance between the collimator lens and the light source, for example.

Considering vibrations and other disturbances, in order to stabilize the tracking control and minimize abnormal track jump, the magnitude of off track may be up to 5% of the track pitch and the TE balance needs to be reduced to 15% or less. According to the PP method, when the lens shift is 0.05 mm, the TE balance becomes 15%. If the lens shift is further increased to ±0.5 mm, then the TE balance becomes 200% or more. In such a state, the tracking control cannot be performed at all or a track jump will occur at once, and therefore, this method cannot be applied to an actual apparatus. That is why the optical tape machine 1 such as the one of this embodiment cannot adopt the PP method.

Next, it will be described what problem the APP method, which should be improved as far as a decline in TE balance during the lens shift is concerned, may have. FIG. 16 is a schematic representation illustrating a simplified exemplary optical arrangement for an optical pickup that adopts the APP method. In FIG. 16, the light source, the collimator lens and other members of the optical system are not illustrated. The light 304 reflected from an optical storage medium 301 is transmitted through an objective lens 302 and incident on a photodetector 303.

FIG. 17 illustrates how the photodetector 303 and its detector will look when viewed in the direction indicated by the arrow A in FIG. 16. The photodetector 303 is divided into two in a direction corresponding to the tracking direction and is further divided into three in a direction corresponding to the track direction. That is to say, the photodetector 303 has six photosensitive cells C1 through C6.

According to the APP method, in order to reduce the offset of the tracking signal due to the lens shift, a differential operation is performed with the signs of the respective outputs of the photosensitive cells C1, C3, C4 and C6, which are located in surrounding areas where there is little tracking signal component, inverted to a situation where the PP method is adopted. That is to say, if the output signals of the photosensitive cells C1 through C6 are identified by c1 through c6, respectively, the tracking signal is represented by (c2−c5)+k(c4+c6)−k(c1+c3) as shown in FIG. 17. By making this arithmetic operation, the DC component offset during the lens shift can be canceled and an offset-free tracking signal can be obtained.

FIGS. 15(c) and 15(d) show how the TE balance and TE amplitude were calculated with respect to the magnitude of lens shift according to the APP method under the same simulation condition as in the PP method described above. It should be noted that the calculations were made with the coefficient k in the equation for calculating the tracking signal by the APP method set to be a value that would minimize the TE balance. As shown in FIG. 15(c), the TE balance appeared to be stabilized until the lens shift reached ±0.4 mm and could be said to fall within the permissible range even at ±0.5 mm. However, as shown in FIG. 15(d), the TE amplitude decreased steeply with the magnitude of lens shift. Specifically, the TE amplitude decreased by 30% when the lens shift was 0.15 mm and decreased by as much as 90% or more when the lens shift was 0.5 mm. This is because as the magnitude of lens shift increases, the point of incidence of the light reflected from the optical disc on a detecting hologram will shift to increasing degrees and the light representing the tracking signal component will be incident on the detector in decreasing quantities. As can be seen, according to the APP method, the TE amplitude changes so significantly that the loop gain of the tracking control changes considerably and loses its stability. For that reason, the APP method cannot be applied to an optical tape machine that requires a lens shift of approximately 0.5, either.

Next, a result of a simulation that was carried out with the CFF method adopted will be described. FIG. 18 is a schematic representation illustrating a simplified exemplary optical arrangement for an optical pickup that adopts the CFF method. In FIG. 18, the light source, the beam splitter and other members of the optical system are not illustrated. And FIG. 19 shows how photodetectors 405 and 406 and their detector look when viewed in the direction indicated by the arrow A in FIG. 18.

The light reflected from an optical storage medium 401 is transmitted through an objective lens 402 and incident on a detecting hologram 404, which has two regions that are divided in the tracking direction and that have mutually different diffraction properties. That is why the light that has been incident on the detecting hologram 404 gets diffracted by those two regions, and the diffracted light beams are directed to photodetectors 405 and 406, respectively. Since the reflected light beams that have been split by the detecting hologram 404 are directed to the photodetectors 405 and 406, the intensity of the reflected light does not increase or decrease due to the lens shift as significantly as in the PP method, and a relatively stabilized output can be obtained.

FIGS. 15(e) and 15(f) show how the TE balance and TE amplitude were calculated with respect to the magnitude of lens shift according to the CFF method under the same simulation condition as in the methods described above. As shown in FIG. 15(f), when the lens shift was 0.5 mm, the variation in amplitude was within −10% and relatively stabilized. As shown in FIG. 15(e), until the lens shift reached the vicinity of 0.12 mm, the TE balance was within 15%. However, once the lens shift exceeded 0.12 mm, the TE balance was more than 15%. And when the lens shift was 0.5 mm, the TE balance increased to about 62%. Thus, even when the CFF method is adopted under this condition, as the magnitude of lens shift increases, the offset of the tracking signal also increases. For that reason, the CFF method cannot be applied to an optical tape machine that requires a lens shift of approximately 0.5, either.

On the other hand, in a configuration for splitting the light beam emitted from a light source into a main beam and a sub-beam using a diffraction grating to perform a DRAW operation, the sub-beam travels obliquely to the main beam, thus raising the problem of a deteriorated read performance. The main beam, which a zero-order light beam, goes straight from the light source and enters the aperture of the objective lens. Meanwhile, the sub-beam, which is a diffracted light beam of first or higher order, goes obliquely with respect to the main beam with a tilt angle corresponding to its angle of diffraction defined with respect to the main beam, and then enters the aperture of the objective lens. That is why although the main beam can enter the entire aperture of the objective lens, the sub-beam 210 cannot enter the entire aperture 207 (i.e., is not incident on some portions of the aperture 207) as shown in FIG. 20. This situation is equivalent to causing a substantial decrease in the NA of the objective lens. As can be seen, the sub-beam cannot be condensed as narrowly as the main beam and will raise the problem of a deteriorated read performance.

The present inventors discovered such a problem with the related art and perfected an optical pickup that can perform read and write operation with good stability even on an optical tape 2 which is an optical storage medium that will cause a significant variation in track position. Hereinafter, it will be described in further detail how the optical pickup 4 of this embodiment operates in the optical tape machine 1 described above and what configuration the optical pickup 4 may have.

1-3. Optical Pickup's Configuration

Figure 4:
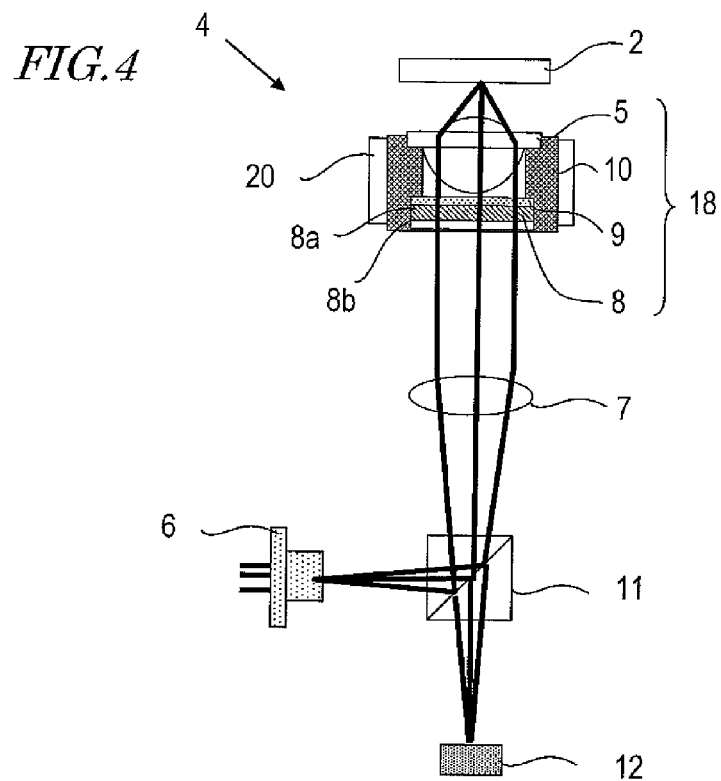
FIG. 4 schematically illustrates an optical configuration for an optical pickup according to an embodiment.

FIG. 4 schematically illustrates an optical configuration for the optical pickup 4, which includes a light source 6, a polarization beam splitter 11, a collimator lens 7, an objective lens unit 18, a lens actuator 20, and a photodetector 12. The objective lens unit 18 includes a polarization hologram plate 8, a quarter wave plate 9 and an objective lens 5, which are supported by an objective lens holder 10.

Figure 3:
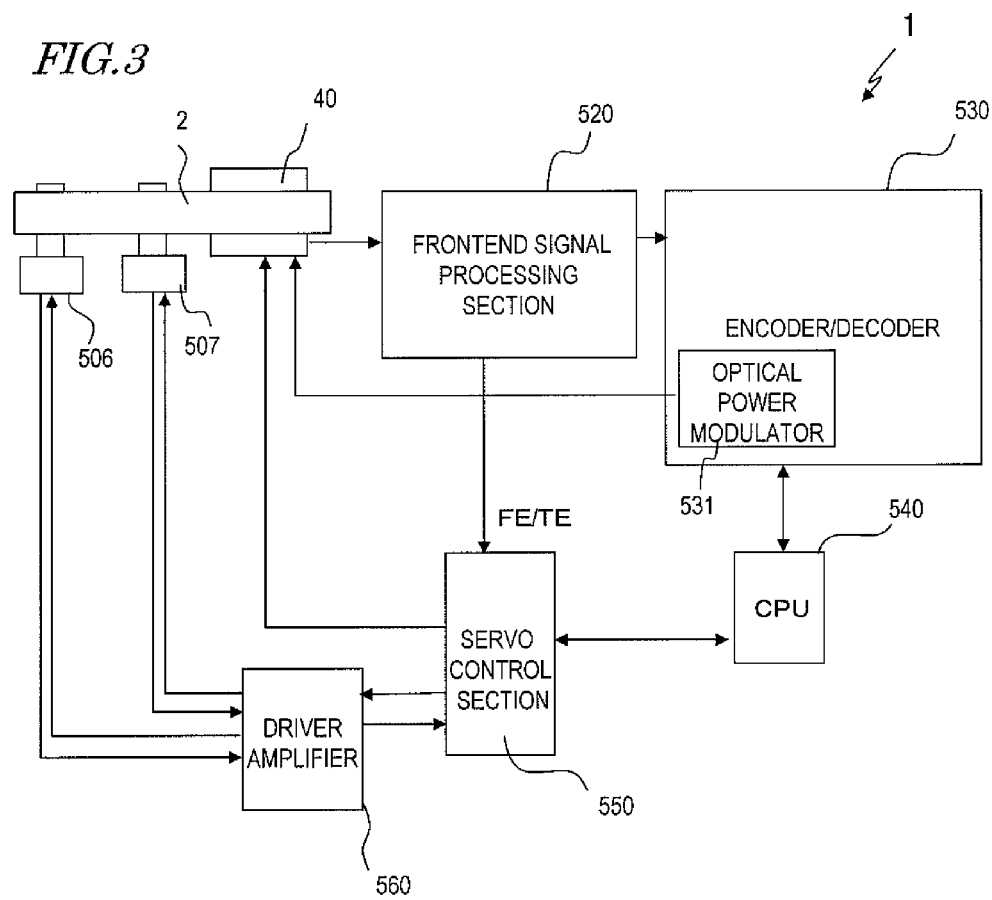
FIG. 3 is a block diagram illustrating a circuit configuration for an optical tape machine according to an embodiment.

The light source 6 is a semiconductor laser light source and is configured to emit an intensity modulated light beam in response to an optical drive signal supplied from the optical power modulator 531 shown in FIG. 3. In this manner, a light beam that has had its intensity modulated according to the data to be written can be emitted from the light source 6.

The polarization beam splitter 11 is an optical element that reflects only a light beam with a particular polarization direction and transmits the other light beams. The polarization beam splitter 11 leads not only the light beam emitted from the light source 6 to the optical tape 2 but also the light beam reflected from the optical tape 2 to the photodetector 12. The collimator lens 7 transforms the light beam that has been reflected from the polarization beam splitter 11 into parallel light beams.

In this embodiment, the objective lens 5, the polarization hologram plate 8, and the wave plate 9 are combined together to form an objective lens unit 18. The objective lens unit 18 is configured so as to be moved by a lens actuator 20 not only perpendicularly to the storage layer of the optical tape 2 (i.e., in the focusing direction) but also parallel to the storage layer and perpendicularly to the tracks (i.e., in the tracking direction) as well. More specifically, as a voltage is applied to the focus coil or tracking coil of the lens actuator 20, the objective lens unit is moved by the focus coil, the tracking coil and an elastic member such as a spring or a wire. These focus and tracking controls by the lens actuator 20 are regulated by the servo control section 550 shown in FIG. 3.

Figure 5:
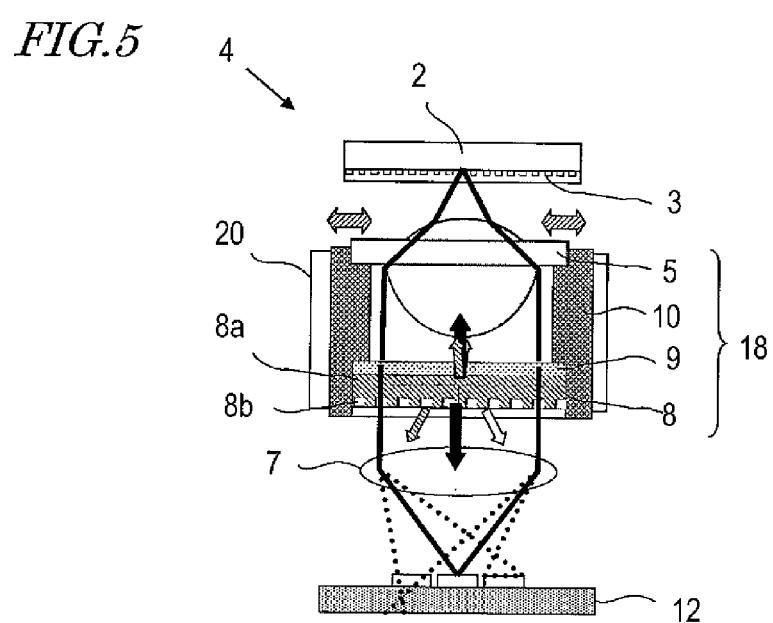
FIG. 5 is a schematic representation illustrating the functions of respective members of the optical pickup shown in FIG. 4.

FIG. 5 is a schematic representation illustrating only a portion of the configuration shown in FIG. 4 with the rest omitted in order to describe the functions of the respective members of the optical pickup 4. In FIG. 5, among the members shown in FIG. 4, illustration of the light source 6 and the polarization beam splitter 11 is omitted. Also, the intervals between the objective lens unit 18, the collimator lens 7 and the photodetector 12 shown in FIG. 5 are shorter than in FIG. 4.

The polarization hologram plate 8 has one surface with a diffraction grating 8a which diffracts only a light beam that is polarized in a particular direction and the other surface with a polarization hologram element 8b which has two diffraction regions that diffract only a light beam, of which the polarization direction is perpendicular to the former direction. In the polarization hologram element 8b, those two diffraction regions are arranged so as to split the polarization hologram element 8b into two in the tracking direction.

The diffraction grating 8a diffracts the light beam emitted from the light source 6, thereby producing a plurality of diffracted light beams including a zero-order diffracted light beam and ±first-order diffracted light beams. In this embodiment, the zero-order diffracted light beam is used as a main beam for writing and the ±first-order diffracted light beams are used as sub-beams for reading. The main beam and the sub-beams are converged by the objective lens 5 onto the same track on the optical tape 2. The hologram element 8b diffracts the light beam that has been reflected from the storage layer of the optical tape 2, thereby producing a plurality of light beams including a zero-order diffracted light beam (transmitted light beam) and ±first-order diffracted light beams.

Figure 6:
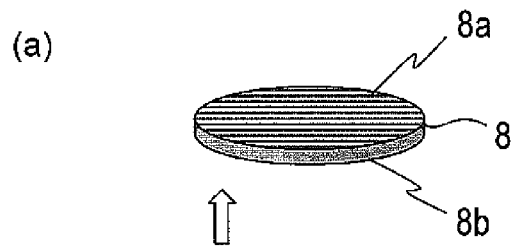
FIG. 6(*a*) is a perspective view illustrating a polarization hologram plate 8 and FIG. 6(*b*) is a plan view illustrating one side of the polarization hologram plate 8 with a polarization hologram element 8*b*.
Figure 6:
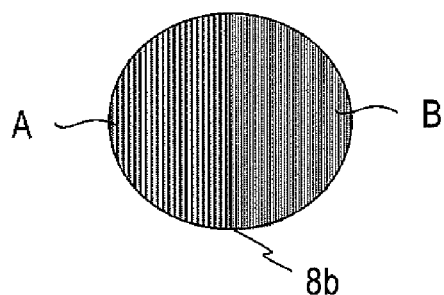

FIGS. 6(*a*) and 6(*b*) schematically illustrate the structure of the polarization hologram plate 8. Specifically, FIG. 6(*a*) is a perspective view illustrating the polarization hologram plate 8 and FIG. 6(*b*) is a plan view of the polarization hologram plate 8 as viewed in the direction indicated by the arrow shown in FIG. 6(*a*). The diffraction grating 8a is designed so as to function as a diffraction grating with respect to only a light beam going toward the optical tape from the light source and function as a transparent medium with respect to the light beam returning from the optical tape toward the photodetector. On the other hand, the polarization hologram element 8b is designed so as to function as a transparent medium with respect to the light beam on the way toward the optical tape and to diffract the incoming light in each of the diffraction regions A and B with respect to the light beam on the way back from the optical tape.

As shown in FIG. 4, the light beam emitted from the semiconductor laser diode of the light source 6 is reflected from the polarization beam splitter 11, and transmitted through the collimator lens 7 to turn into a parallel light beam. This parallel light beam is split by the diffraction grating 8a on one surface of the polarization hologram plate 8, which is fixed on the objective lens holder 10, into a main beam and two sub-beams. Those main and sub-beams that have left the diffraction grating 8a are plane polarized light beams, but turn into either circularly or elliptically polarized light beams by being transmitted through the quarter wave plate 9. The main beam and the two sub-beams that have been transmitted through the quarter wave plate 9 are condensed by the objective lens 5, thereby forming a main spot and two sub-spots on the same track on the optical tape 2. The reflected light beams that have left those spots on the optical tape 2 are transmitted through the objective lens 5 and then transformed by the quarter wave plate 9 into plane polarized light beams, of which the plane of polarization has rotated 90 degrees with respect to the light beam on the way toward the optical tape. As a result, the reflected light is not diffracted by, but just transmitted through, the diffraction grating 8a of the polarization hologram plate 8 shown in FIG. 5. On the other hand, the polarization hologram element 8b, which is arranged to face the diffraction grating 8a, does diffracts the incoming light beam, thereby producing a zero-order diffracted light beam and ±first-order diffracted light beams out of each of the main and sub-beams. Of these diffracted light beams, one of the ±first-order diffracted light beams that have been produced from the main beam incident on the regions A and B is used to generate a tracking error signal, while the other of the ±first-order diffracted light beams that have been produced from the main beam incident on the regions A and B is used to generate a focus error signal.

The zero-order and ±first-order diffracted light beams which have been produced from the main beam by the hologram pattern that has been split into two regions A and B in the tracking direction and the two sub-beams which have been reflected from the optical tape 2 are incident on their associated photosensitive elements on the photodetector 12. And based on the electrical signals output from those photosensitive elements, a tracking error signal, a focus error signal, and a DRAW read signal are obtained. In this manner, the polarization hologram plate 8 generates not only DRAW sub-beams by using the pattern of the diffraction grating 8a that intersects with the track direction at right angles but also diffracted sub-beams to detect a tracking error signal by the CFF method. That is to say, the polarization hologram plate 8 has two functions.

Figure 7:
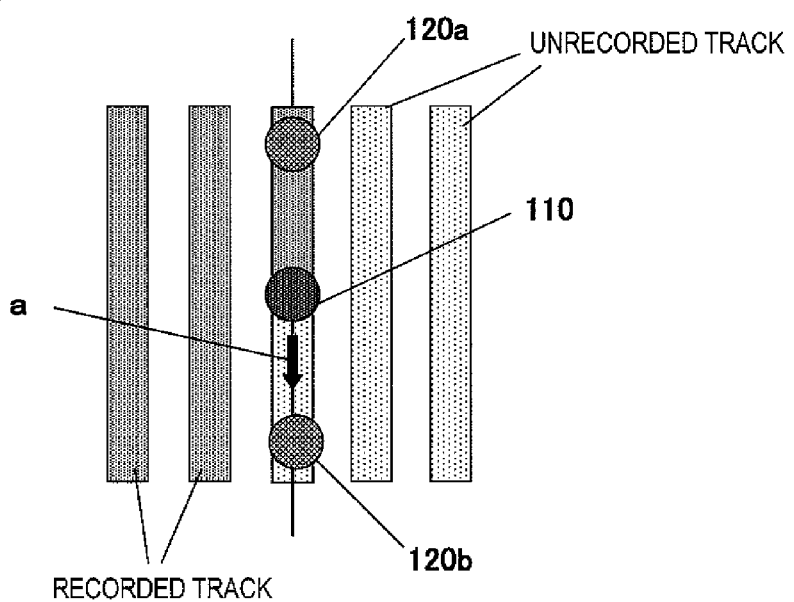
FIG. 7 is a schematic representation illustrating how a main spot and two sub-spots are formed on a track on an optical tape.

FIG. 7 is a schematic representation illustrating how light beam spots are formed on the optical tape 2. The optical system of the optical pickup 4 is adjusted so that the main beam and two sub-beams that have left the diffraction grating 8a form a main spot 110 and two sub-spots 120a, 120b, respectively, on the same track on the optical tape 2. The diffraction efficiency of the diffraction grating 8a of the polarization hologram plate 8 is determined so that if the intensity of light at the main spot 110 is set to be write power, the intensity of light at the sub-spots 120a and 120b is appropriate for reading a signal. If a write operation is performed on the optical tape 2 in the direction indicated by the arrow a, a mark that has just been written is scanned and read with the first sub-spot 120a. On the other hand, if a write operation is performed in the opposite direction to the one indicated by the arrow a, a mark that has just been written is scanned and read with the second sub-spot 120b. In this manner, the optical pickup 4 of this embodiment is configured to carry out a DRAW operation, no matter in which direction the optical tape 2 is running.

In this embodiment, as the diffraction grating 8a and the objective lens 5 are fixed on the objective lens holder 10 so as to be arranged close to each other, the two sub-beams pass through the aperture without deviating so much from the center of the aperture. For that reason, unlike the known arrangement, the aperture of the objective lens 5 will not have any portion that the sub-beam does not enter at all depending on the angle of diffraction and the distance. Consequently, according to this embodiment, the two sub-beams, as well as the main beam, can also be condensed narrow enough to produce a beam that can be used effectively to perform a DRAW with high read performance.

Figure 8:
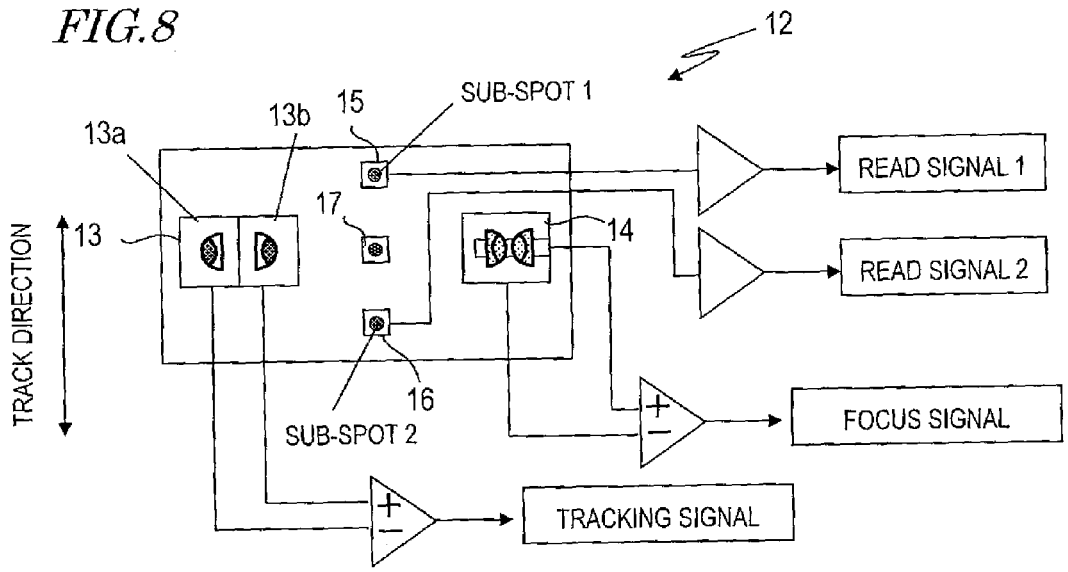
FIG. 8 schematically illustrates an exemplary configuration for a photodetector and its photosensitive elements.

FIG. 8 schematically illustrates an exemplary configuration for the photodetector 12 and the signals generated. Specifically, FIG. 8 illustrates how the photodetector 12 receives the light reflected from the optical tape 2 and detects respective kinds of signals. The photodetector 12 includes photosensitive elements 13 through 17 and generates those signals based on their outputs. In the example illustrated in FIG. 8, the CFF method is adopted as the tracking detecting method and the spot sized detection method is adopted as the focus detecting method.

Of the reflected light that has left the two sub-spots 120a and 120b on the optical tape 2, the light that has been transmitted through the polarization hologram element 8b (i.e., the zero-order diffracted light) is incident on the photosensitive elements 15 and 16. One of the output signals of the photosensitive elements 15 and 16 is used as a DRAW read signal. It depends on the direction in which data is going to be written on the optical tape 2 which of the two outputs should be used as the DRAW read signal. In this embodiment, the photodetector 12 is configured to switch the outputs of the photosensitive elements 15 and 16 according to the writing direction on the optical tape 2.

On the other hand, of the reflected light that has left the main spot 110 on the track on the optical tape 2, the light that has been transmitted through the polarization hologram element 8b (i.e., the zero-order diffracted light) is incident on the photosensitive element 17. Although not shown in FIG. 8, the output of the photosensitive element 17 may be used as a read signal in a read mode that does not perform any DRAW operation.

Of the reflected light that has left the main spot 110 on the track on the optical tape 2, the +first-order diffracted light that has been diffracted by the polarization hologram element 8b is incident on the photosensitive element 14, which is split into a central portion and a peripheral portion. The photosensitive element 14 performs a differential operation between the respective outputs of the central and peripheral portions so as to generate a focus signal by the spot sized detection method.

Meanwhile, of the reflected light that has left the main spot 110, the –first-order diffracted light that has been diffracted by the regions A and B of the polarization hologram element 8b is incident on the two divided areas 13a and 13b of the photosensitive element 13. By performing a differential operation on the output signals of those two areas 13a and 13b, a tracking signal is generated by the CFF method.

Figure 9:
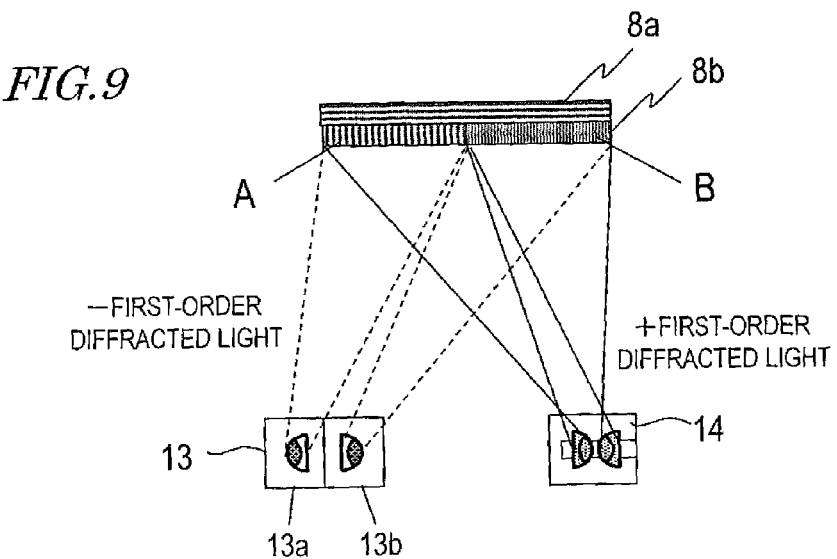
FIG. 9 is a schematic representation illustrating how diffracted light beams that have been transmitted through a polarization hologram element 8*b* are incident on photosensitive elements 13 and 14.

FIG. 9 is a schematic representation illustrating more specifically how the ±first-order diffracted light beams that have gone through each of the diffraction regions A and B of the polarization hologram element 8b are incident on the photosensitive elements 13 and 14. In FIG. 9, illustration of the optical elements other than the polarization hologram plate 8 and the photosensitive elements 13 and 14 is omitted. As shown in FIG. 9, the +first-order diffracted light beams that have gone through the regions A and B of the polarization hologram element 8b form light beam spots on the left- and right-hand sides of the photosensitive element 14. As the sizes of these light beam spots change according to the focus state, a focus signal can be obtained by making the arithmetic operation described above. On the other hand, the –first-order diffracted light beams that have gone through the regions A and B of the polarization hologram element 8b form light beam spots on the left- and right-hand sides 13a and 13b of the photosensitive element 13. When an abnormal track jump occurs, the horizontal balance between these light beam spots changes. And therefore, a tracking signal can be obtained by making the arithmetic operation described above. In this example, the hologram pattern of the regions A and B is designed so that the ±first-order diffracted light beams are incident on the photosensitive elements 14 and 13, respectively. However, this is only an example of the present disclosure. That is to say, the regions A and B may also be designed so as to lead the ±first-order diffracted light beams to the photosensitive elements 13 and 14, respectively. Also, the layout of the respective photosensitive elements may be changed appropriately according to the hologram pattern of the polarization hologram element 8b. In any case, as long as a tracking signal can be obtained by the CFF method, the polarization hologram element 8b and the photosensitive element 13 may have any other configuration.

Next, it will be described how the verify operation can get done by using the read signals that are output from the photosensitive elements 15 and 16. In writing data on an unrecorded optical tape 2, the verify operation can get done by calculating the difference between the respective outputs of the photosensitive elements 15 and 16 and by comparing their differential signal to an optical drive signal. Hereinafter, this respect will be described with reference to FIG. 10.

Portion (a) of FIG. 10 shows an exemplary waveform of an optical drive signal. Portion (b) of FIG. 10 schematically illustrates the shapes of marks to be recorded on a track. Each of these marks is recorded on an area where the main spot 110 is located when the optical drive signal is high.

Portions (c) and (d) of FIG. 10 show the waveform of a signal representing the reflected light of a sub-beam that irradiates the optical tape 2 after the main beam has irradiated it (and which will be referred to herein as a "following sub-beam") and that of a signal representing the reflected light of a sub-beam that irradiates the optical tape before the main beam irradiates it (and which will be referred to herein as a "preceding sub-beam"), respectively. As can be seen from portion (c) of FIG. 10, the waveform of the reflected light of the following sub-beam is affected by a recorded mark because the spot of a light beam that has been modulated with the optical drive signal has moved on a track with the recorded mark. On the other hand, as can be seen from portion (d) of FIG. 10, the waveform of the reflected light of the preceding sub-beam is not affected by any recorded mark because the spot of a light beam that has been modulated with the optical drive signal has moved on a track with no recorded marks.

Portion (e) of FIG. 10 shows the waveform of a differential signal that is obtained by subtracting the signal representing the reflected light of the following sub-beam from the signal representing the reflected light of the preceding sub-beam. This waveform includes information about the positions and shapes of the recorded marks, i.e., information about the data written. By comparing this signal to the optical drive signal, it can be determined whether or not data has been written properly. This decision may be made by the CPU 540 shown in FIG. 3, for example.

As described above, according to this embodiment, a verify read signal is generated by calculating the difference between two detection signals representing the reflected light beams of the two sub-beams. However, the verify read signal may also be generated by a different method. For example, if a photodetector is provided to detect a light beam that has been emitted from the light source 6 but has not been reflected from the optical tape 2 yet, then the verify operation can also be performed based on the detection signal generated by the photodetector. That is to say, the same verify read signal can also be obtained by calculating the difference between a signal representing the following sub-beam and either the output signal of the photodetector or a signal obtained by making a correction on that signal as needed. Such a photodetector may be arranged opposite to the light source 6 with respect to the beam splitter 11. In such a configuration, the signal representing the preceding sub-beam is not used. That is why if the apparatus is configured so that the optical tape 2 always runs in the same direction without reversing its running direction, the preceding sub-beam does not have to be converged on the track on the optical tape 2.

1-4. Condition for Obtaining Stabilized Tracking Signal

The CFF method for use in this embodiment is regarded as achieving a relatively stabilized TE balance and not producing an offset easily among various one-beam tracking detecting methods. According to the result of the simulation described above, however, the condition that the TE balance should be within 15% at a lens shift of ±0.3 to 0.6 mm that an optical tape needs to have could not be satisfied.

Thus, the present inventors carried out a simulation to calculate how the tracking signal would behave when a lens shift occurred with the track groove parameters and the values of parameters to affect the offset of the tracking signal varied. As a result, we found a condition for obtaining a stabilized tracking signal even when a lens shift occurs. The following is such a condition:

The tracking signal was calculated under the condition including an objective lens' NA of 0.85, a lens shift of 0.5 mm, a light source wavelength of $\lambda$, and a track groove pitch of $0.8\lambda$ and with the radial Rim intensity R and the track groove depth d varied. The results of the calculations are shown in FIGS. 11A through 12B.

FIG. 11A shows how the TE balance (%) at a lens shift of −0.5 mm changed with the groove depth d, which was varied within the range of 0 to $0.5\lambda$, when the radial Rim intensity was set to be 0.6, 0.76, 0.85 and 0.89. As a result, the TE balance changed symmetrically with respect to a groove depth of $0.25\lambda$. Although not shown in FIG. 11A, the TE balance at a lens shift of +0.5 mm is represented by a curve that is symmetrical with respect to the TE balance 0% axis shown in FIG. 11A. In this case, the width b between the two intersections at which the TE balance curve associated with any of the Rim intensities and a line representing a TE balance of −15% cross each other is identified herein by b_1, b_2, b_3, or b_4 ($\lambda$). In FIG. 11A, shown is the range in which the (absolute value of the) TE balance at a lens shift of 0.5 mm is equal to or smaller than 0.15% when b falls within any of those ranges. FIG. 11B is a graph plotting the relation between the radial Rim intensity and the width b. The following approximation equation can be derived from this graph:

$$b = 1.2R^2 - R + 0.395$$

As the width b is the width of a region that is symmetrical with respect to a groove depth of 0.25 µm, the condition to be satisfied by the groove depth $d(\lambda)$, the radial RIM intensity R and the wavelength $\lambda$ is represented by the following Inequality (1):

$$0.25\lambda - (1.2R^2 - R + 0.395)\lambda/2 \leq d \leq 0.25\lambda + (1.2R^2 - R + 0.395)\lambda/2 \quad (1)$$

This equation specifies a condition imposed on the groove depth d, the radial Rim intensity R and the wavelength $\lambda$ to make the (absolute value of the) TE balance equal to or smaller than 15% even when the lens shift is 0.5 mm.

Next, the results of the simulation that was carried out on the TE amplitude will be described with reference to FIGS. 12A and 12B. FIG. 12A is a graph showing how the TE amplitude at a lens shift of 0.5 mm changed with the groove depth d, which was varied within the range of 0 to $0.5\lambda$, when the radial Rim intensity was set to be 0.6, 0.76, 0.85 and 0.89, under the same condition as the calculations shown in FIGS. 11A and 11B. In this case, the TE amplitude associated with a radial Rim intensity of 1 and a lens shift of 0 mm is supposed to be one. The TE amplitude reached its peaks when the groove depths were $0.125\lambda$ and $0.375\lambda$ but decreased as the groove depth exceeded those values. Particularly once the amplitude became smaller than 0.5, the amplitude decreased steeply and became substantially equal to zero when the groove depth was $0.25\lambda$. That is why according to this embodiment, TE amplitude $\geq 0.5$ is defined to be the condition to satisfy as a range in which the TE amplitude is large enough and stabilized. In this case, the width a between the two intersections at which the TE amplitude curve associated with any of the Rim intensities and a line representing a TE amplitude of 0.5 cross each other is identified herein by a_1, a_2, a_3, or a_4. This width a is the width of a range in which TE$\geq 0.5$ can be maintained at a lens shift of 0.5 mm.

FIG. 12B is a graph plotting the radial Rim intensity and the width a. The following approximation equation can be obtained from this graph:

$$a = -0.2R^2 + 0.45R - 0.085$$

Since the width a is the width of a range that is symmetric with respect to a groove depth of $0.125\lambda$, the condition to be satisfied by the groove depth $d(\lambda)$, the radial Rim intensity R and the wavelength $\lambda$ is represented by the following Inequality (2):

$$0.125\lambda - (-0.2R^2 + 0.45R - 0.085)\lambda/2 \leq d \leq 0.375\lambda + (-0.2R^2 + 0.45R - 0.085)\lambda/2 \quad (2)$$

Also, as TE amplitude $\geq 0.5$ is also satisfied in a range that is symmetric with respect to a groove depth of $0.375\lambda$, the condition to be satisfied by the groove depth $d(\lambda)$, the radial Rim intensity R and the wavelength $\lambda$ is represented by the following Inequality (3):

$$0.375\lambda - (-0.2R^2 + 0.45R - 0.085)\lambda/2 \leq d \leq 0.375\lambda + (-0.2R^2 + 0.45R - 0.085)\lambda/2 \quad (3)$$

Inequalities (2) and (3) specify the condition imposed on the groove depth d, the radial Rim intensity R and the wavelength $\lambda$ to satisfy TE amplitude $\geq 0.5$ even when the lens shift is 0.5 mm.

Consequently, if the radial RIM intensity R and the wavelength $\lambda$ of each optical pickup 4 are set so as to satisfy either Inequalities (1) and (2) or Inequalities (1) and (3), then TE balance $\leq 15\%$ and TE amplitude $\geq 0.5$ are satisfied even at a lens shift of 0.5 mm. That is to say, a stabilized tracking signal with little offset can be obtained and the tracking control can be stabilized.

In the simulations described above, the objective lens' NA is supposed to be 0.85, the lens shift 0.5 mm and the track groove pitch $0.8\lambda$. However, even if the actual values are somewhat different from these values, the conditions represented by Inequalities (1) to (3) are substantially satisfied. For example, even if the objective lens' NA is set to be 0.81 to 0.89, the upper limit of the lens shift 0.3 mm to 0.6 mm, and the track groove pitch $0.75\lambda$ to $0.85\lambda$, the conditions specified by those Inequalities (1) to (3) may also be applied.

As can be seen, according to this embodiment, even if the upper limit of the lens shift is set to be 0.3 mm to 0.5 mm by adopting the CFF method as a tracking detecting method, the offset can still fall within a permissible range and a sufficient TE amplitude can also be secured. As a result, a stabilized tracking control is realized even in an optical tape machine with a significant lens shift.

1-5. Effects

As described above, the optical pickup 4 of this embodiment can write data on a track of an optical storage medium (such as the optical tape 2) and read the data being written on that track in parallel. The optical pickup 4 includes: a light source 6 which emits a light beam; a first diffractive element (diffraction grating 8a) which diffracts light that is polarized in a particular direction; an objective lens 5 which converges a write beam and a read beam onto the same track on the optical tape 2; a lens actuator 20 which shifts the objective lens to perform a focus control and tracking control; a wave plate 9 which is arranged between the diffraction grating 8a and the optical tape 2; a second diffractive element (polarization hologram element 8b) which has two diffraction regions A and B with different diffraction properties that are arranged in a direction corresponding to the tracking direction; and a photodetector 12. The lens actuator 20 shifts the objective lens 5 so that the magnitude of shift of the objective lens 5 from its initial position as measured in a tracking direction has an upper limit of 0.3 mm to 0.6 mm. The diffraction grating 8a splits the light beam that has been emitted from the light source 6 into a plurality of light beams including a write beam and a read beam. The wave plate 9 is designed so that the polarization direction of light going from the diffraction grating 8a toward the wave plate 9 is perpendicular to the polarization direction of light going from the wave plate 9 toward the diffraction grating 8a. In the polarization hologram element 8b, each of the diffraction regions A and B is configured to diffract light that is polarized in a direction that intersects with the particular direction at right angles. The polarization hologram element 8b splits the write beam that has been reflected from the optical tape 2 through each of the diffraction regions A and B into a transmitted light beam and ±first-order diffracted light beams. The photodetector 12 includes a plurality of photosensitive elements that are configured to detect the transmitted light beam, the ±first-order diffracted light beams that have left the diffraction regions A and B, and the read beam that has been reflected from the optical tape 2. By adopting such a configuration, a DRAW operation can be performed on an optical tape in which a track position may vary significantly during a read or write operation and a stabilized tracking signal can be obtained. As a result, the quality of the read/write operation can be improved.

In the embodiment described above, a diffraction grating 8a is used as the first diffractive element and a polarization hologram element 8b is used as the second diffractive element. And the diffraction grating 8a and the polarization hologram element 8b are combined together to form a polarization hologram plate 8. Thus, an element that generates a main beam and sub-beams for use to perform a DRAW operation and an element that generates a diffracted light beam to obtain a tracking signal by the CFF method can be combined together. As a result, the overall size of the apparatus can be reduced.

On top of that, the polarization hologram plate 8, the wave plate 9 and the objective lens 5 are combined together to form a single lens unit 18. And the lens actuator 20 shifts the objective lens 5 by shifting the lens unit 18 in its entirety. Thus, it is possible to prevent a DRAW sub-beam from deviating significantly from the center of the aperture of the objective lens 5. As a result, the DRAW read signal can have improved quality. In addition, since the objective lens 5 and the polarization hologram plate 8 always move together during a lens shift, deterioration in the quality of a tracking signal can also be minimized.

Furthermore, the photodetector 12 generates a tracking signal by calculating the difference between the output signals of two photosensitive elements, which detect +first-order diffracted light beams or −first-order diffracted light beams that have left the two diffraction regions A and B of the polarization hologram element 8b, among the plurality of photosensitive elements. As a result, a relatively stabilized tracking signal can be obtained.

Furthermore, if the track pitch of the optical tape 2 is a and the wavelength of the light emitted from the light source 6 is $\lambda$, $a/0.850 \leq \lambda \leq a/0.75$ is satisfied. The objective lens 5 has a numerical aperture of 0.81 to 0.89. If the radial Rim intensity of the light entering the objective lens 5 is R and the track groove depth of the optical storage medium is d, then either Inequalities (1) and (2) or Inequalities (1) and (3) are both satisfied. As a result, even if the lens shift is set to be as large as 0.3 mm to 0.6 mm, a tracking signal, of which the TE balance and TE amplitude are both stabilized, can be obtained.

Other Embodiments

Although an embodiment of an optical pickup has been described herein as just an example of the present disclosure, various modifications, replacements, additions or omissions can be readily made on that embodiment as needed and the present disclosure is intended to cover all of those variations. Also, a new embodiment can also be created by combining respective elements that have been described for that embodiment disclosed herein.

In the embodiment described above, the diffraction grating 8a is used as an example of the first diffractive element and the polarization hologram element 8b is used as an example of the second diffractive element. However, this is only an example of the present disclosure. The first diffractive element may have any other configuration as long as it is configured to split the light beam emitted from the light source into a plurality of light beams including a write beam and a read beam. Likewise, the second diffractive element may also have any other configuration as long as it has two diffraction regions that are arranged in a direction corresponding to the tracking direction and that have mutually different diffraction properties and as long as each of those diffraction regions is configured to split the write beam that has been reflected from the optical storage medium into a transmitted light beam and at least one diffracted light beam. For example, the polarization hologram plate 8 may be replaced with a hologram pattern in which two layers that have the same properties as the diffraction grating 8a and the polarization hologram element 8b are stacked one upon the other.

Also, in the embodiment described above, the first and second diffractive elements, the wave plate and the objective lens are combined together to form a single lens unit. However, this is only an example of the present disclosure. Alternatively, these elements may be provided separately from each other. In that case, a mechanism that shifts both the objective lens 5 and the second diffractive element together in the tracking direction may be provided.

Furthermore, the optical storage medium does not have to be an optical tape. The optical pickup and optical read/write apparatus with the configurations described above are also applicable to any other kind of optical storage medium.

Furthermore, in the embodiment described above, the optical read/write apparatus has twelve optical pickups. However, the number of optical pickups provided may be determined arbitrarily. The present disclosure is applicable to an optical read/write apparatus that has at least one optical pickup.

Various embodiments of the present disclosure have been described by providing the accompanying drawings and a detailed description for that purpose.

That is why the elements illustrated on those drawings and/or mentioned in the foregoing description include not only indispensable elements that need to be used to overcome the problems described above but also other inessential elements that do not have to be used to overcome those problems but are just mentioned or illustrated to give an example of the present disclosure. Therefore, you should not make a superficial decision that those inessential additional elements are indispensable ones because they are illustrated or mentioned on the drawings or the description.

Also, the embodiments disclosed herein are just an example of the present disclosure, and therefore, can be subjected to various modifications, replacements, additions or omissions as long as those variations fall within the scope of the present disclosure as defined by the appended claims and can be called equivalents.

If an optical pickup according to an embodiment of the present disclosure is used in a bulk data storage system that includes a number of such pickups, data can be written accurately either on multiple different areas of a given optical storage medium or on multiple different optical storage media in parallel with each other. Thus, the optical read/write apparatus of the present disclosure can be used effectively as a cost-effective read/write apparatus with a simplified configuration.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2011-227530 filed Oct. 17, 2011 and No. 2012-171842 filed Aug. 2, 2012, the entire contents of which are hereby incorporated by reference.

What is claimed is:

1. An optical pickup that writes data on a track on an optical storage medium and reads the data being written on the track in parallel, the optical pickup comprising:
   a light source configured to emit a light beam;
   a first diffractive element configured to diffract light that is polarized in a particular direction and split the light beam that has been emitted from the light source into a plurality of light beams including a write beam and a read beam;
   an objective lens configured to converge the write beam and the read beam onto the same track on the optical storage medium;
   a lens actuator configured to shift the objective lens to perform a focus control and a tracking control so that the magnitude of shift of the objective lens from its initial position as measured in a tracking direction has an upper limit of 0.3 mm to 0.6 mm;
   a wave plate that is arranged between the first diffractive element and the optical storage medium and that is designed so that the polarization direction of light going from the first diffractive element toward the wave plate is perpendicular to the polarization direction of light going from the wave plate toward the first diffractive element;
   a second diffractive element including two diffraction regions with different diffraction properties that are arranged in a direction corresponding to the tracking direction, each said diffraction region being configured to diffract light that is polarized in a direction that intersects with the particular direction at right angles, the second diffractive element configured to split the write beam that has been reflected from the optical storage medium through each said diffraction region into a transmitted light beam and at least one diffracted light beam; and
   a photodetector including a plurality of photosensitive elements that are configured to detect the transmitted light beam, the diffracted light beams that have left the two diffraction regions, and the read beam that has been reflected from the optical storage medium.

2. The optical pickup of claim 1, wherein the first diffractive element is a diffraction grating and the second diffractive element is a polarization hologram element.

3. The optical pickup of claim 2, comprising a polarization hologram plate in which the first and second diffractive elements are combined with each other.

4. The optical pickup of claim 3, wherein the polarization hologram plate, the wave plate and the objective lens are combined together to form a single unit, and
   wherein the lens actuator is configured to shift the unit.

5. The optical pickup of claim 1, wherein the photodetector is configured to perform a differential operation between the output signals of two of the photosensitive elements, which detect the diffracted light beams that have left the two diffraction regions, thereby generating a tracking error signal.

6. The optical pickup of claim 1, wherein if the track pitch of the optical storage medium is a and the wavelength of the light emitted from the light source is $\lambda$, $a/0.85 \leq \lambda \leq a/0.75$ is satisfied, and wherein the objective lens has a numerical aperture of 0.81 to 0.89, and wherein if the radial Rim intensity of the light entering the objective lens is R and the track groove depth of the optical storage medium is d, then $0.25\lambda-(1.2R^2-R+0.395)\lambda/2 \leq d \leq 0.25\lambda+(1.2R^2-R+0.395)\lambda/2$ and $0.125\lambda-(-0.2R^2+0.45R-0.085)\lambda/2 \leq d \leq 0.125\lambda+(-0.2R^2+0.45R-0.085)\lambda/2$ are both satisfied, or $0.25\lambda-(1.2R^2-R+0.395)\lambda/2 \leq d \leq 0.25\lambda+(1.2R^2-R+0.395)\lambda/2$ and $0.375\lambda-(-0.2R^2+0.45R-0.085)\lambda/2 \leq d \leq 0.375\lambda+(-0.2R^2+0.45R-0.085)\lambda/2$ are both satisfied.

7. An optical read/write apparatus comprising:

at least one optical pickup;

a signal processing section configured to process the output signal of the optical pickup; and a controller configured to control the optical pickup based on the output of the signal processing section, and wherein the optical pickup comprises:

a light source configured to emit a light beam;

a first diffractive element configured to diffract light that is polarized in a particular direction and split the light beam that has been emitted from the light source into a plurality of light beams including a write beam and a read beam;

an objective lens configured to converge the write beam and the read beam onto the same track on the optical storage medium;

a lens actuator configured to shift the objective lens to perform a focus control and a tracking control so that the magnitude of shift of the objective lens from its initial position as measured in a tracking direction has an upper limit of 0.3 mm to 0.6 mm;

a wave plate that is arranged between the first diffractive element and the optical storage medium and that is designed so that the polarization direction of light going from the first diffractive element toward the wave plate is perpendicular to the polarization direction of light going from the wave plate toward the first diffractive element;

a second diffractive element including two diffraction regions with different diffraction properties that are arranged in a direction corresponding to the tracking direction, each said diffraction region being configured to diffract light that is polarized in a direction that intersects with the particular direction at right angles, the second diffractive element configured to split the write beam that has been reflected from the optical storage medium through each said diffraction region into a transmitted light beam and at least one diffracted light beam; and a photodetector including a plurality of photosensitive elements that are configured to detect the transmitted light beam, the diffracted light beams that have left the two diffraction regions, and the read beam that has been reflected from the optical storage medium.

* * * * *